United States Patent [19]

South

[11] Patent Number: 4,808,074
[45] Date of Patent: Feb. 28, 1989

[54] VERTICAL AXIS WIND TURBINES

[75] Inventor: Peter South, Weston, Canada

[73] Assignee: Canadian Patents and Development Limited-Societe Canadienne Des Breyets et D'Exploitation Limitee, Ottawa, Canada

[21] Appl. No.: 36,897

[22] Filed: Apr. 10, 1987

[51] Int. Cl.⁴ .................................... F03D 7/04
[52] U.S. Cl. .................................. 416/140; 416/119
[58] Field of Search ............... 416/119, 140 R, 227 A, 416/DIG. 8

[56] References Cited

U.S. PATENT DOCUMENTS

| | | | |
|---|---|---|---|
| 1,835,018 | 12/1931 | Darrieus | 416/119 |
| 2,554,774 | 5/1951 | Buivid | 416/119 |
| 2,604,953 | 7/1952 | Campbell | 416/119 |
| 3,638,885 | 2/1972 | Reed | 416/140 |
| 4,378,198 | 3/1983 | Pettersson | 416/140 |
| 4,431,375 | 2/1984 | Carter | 416/140 |

Primary Examiner—Henry A. Bennet
Attorney, Agent, or Firm—Bauer & Schaffer

[57] ABSTRACT

The invention relates to improvements in and relating to vertical axis wind turbines, particularly those of the "eggbeater" type. It has been found possible, in spite of previous beliefs that it was not so, to provide energy exchange means between the blades and the rotor to thereby smooth out cyclic variations in transmitted torque. The energy exchange means may be, for example, the provision of hinges between the blades and the rotor so that the blade is deflected in operation to transmit torque to the rotor in dependence not only on its fixed geometry but also in dependence on the deflection.

10 Claims, 8 Drawing Sheets

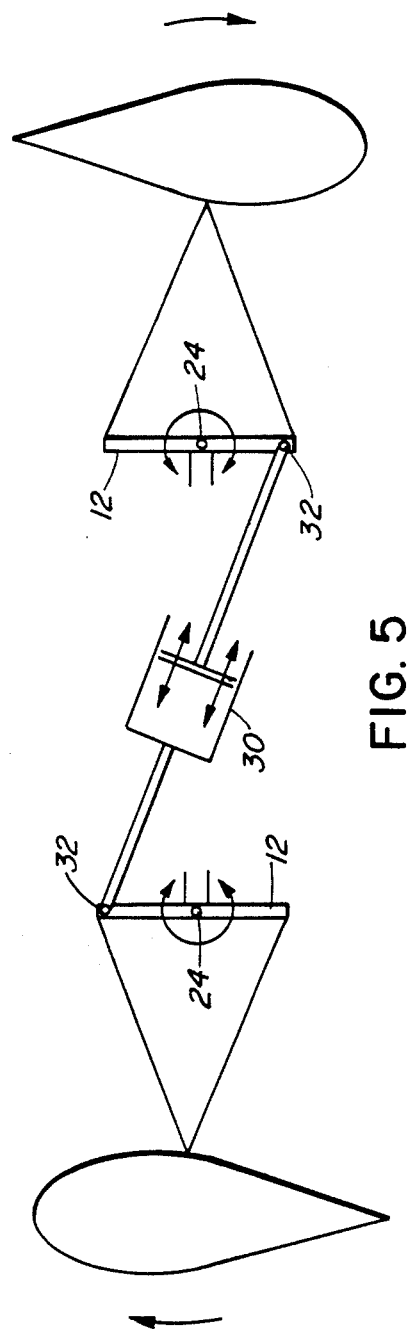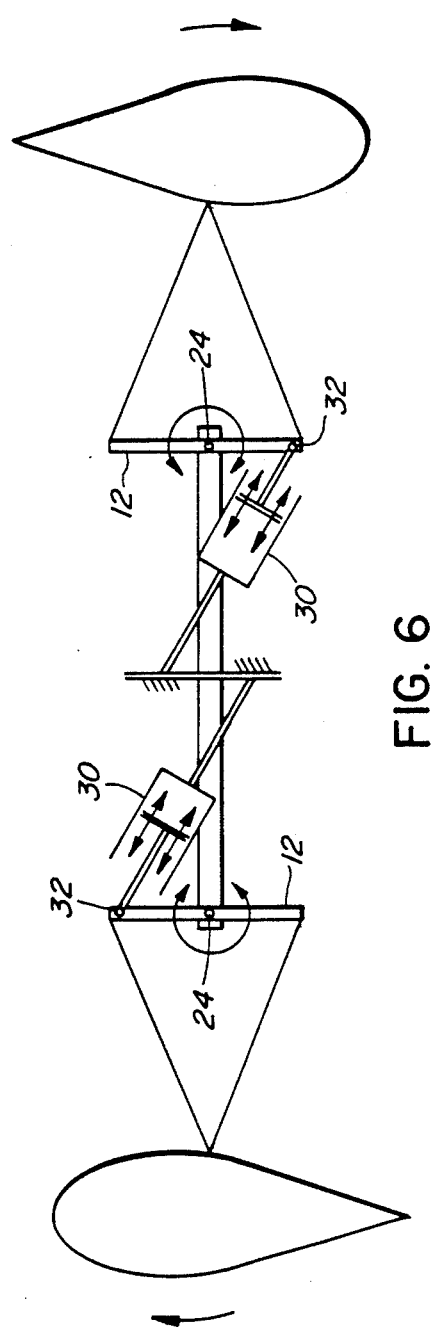

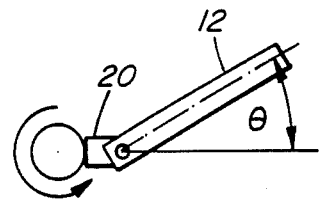
FIG. 10
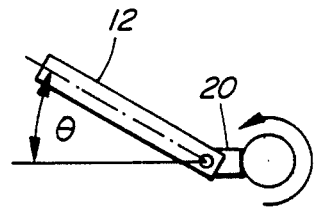
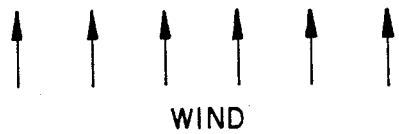
FIG. 11

VERTICAL AXIS WIND TURBINES

This invention relate to improvements in and relating to vertical axis wind turbines.

On a vertical axis wind turbine the aerodynamic torque developed is cyclical in form having peaks occurring twice per complete revolution. If the blade is moving exactly into or out of the wind the lifting force, and hence torque, is zero but at all other times some net torque is produced. A plot of the developed torque against the blade position in its revolution shows that torque development is essentially sinusoidal.

When the wind turbine is connected to a power absorbing device the varying torque can produce a varying power output. Thus the end result of varying torque is always varying power output. Moreover, the cyclic loads on the drive train cause fatigue problems which have resulted in the use of oversized transmissions.

The problems are particularly acute in two blade machines which have been found to have various advantages over machines having a much greater number of blades. In a two blade machine, the even harmonics combine to produce a torque ripple and the odd harmonics produce a "butterfly" mode that causes significant bending stresses and has necessitated that the attachment of the blade to the rotor be more rugged than if the cyclic stresses did not exist.

A problem has existed in the provision of means to reduce the effect of cyclical loads in wind turbine design. Design considerations have been addressed in: Templin, R. J., Aerodynamic Performance Theory for the NRC Vertical Axis Wind Turbine, National Research Council Laboratory Technical Report LTR-LA-160 (June 1974); Templin, R. J. and South, P. Some Design Aspects of High Speed Vertical Axis Wind Turbines, International Symposium on Wind Energy Systems, Cambridge, England, (September 1976); Ham, D. N., Flutter of Darrieus Wind Turbine Blades, from "Wind Turbine Structural Dynamics," NASA Publication CONF-2034, (November 1977); and Ham, D. N. Flutter of Darrieus Wind Turbine Blades: Correlation of Theory and Experiment, Proceedings DOE/NASA Wind Turbine Dynamics Workshop, Cleveland, (February 1981).

It has been clear that it would be desirable to introduce means to exchange energy between each blade root and its associated rotor but it has not been clear how this is to be achieved in the light of the fact that damping of any movement between blade and rotor is undesirable except during start-up and braking and, especially, due to the fact that it has been thought that the introduction of any mechanical energy exchange means involving movement between blade and rotor will introduce an insuperable problem of flutter in the blades, which, according to the Templin and South reference (1976) is already a considerable problem where struts between the blade bodies and the rotor are not used for support.

It has now been surprisingly discovered that an energy exchange device may be located at the blade root with a rotor of a wind turbine without encountering disadvantageous flutter problems. It was further discovered that the main influence on flutter was the ratio of the rotor height to the turbine diameter. With the exception of the provision of supporting braces from the rotor to the blade bodies and the blade section properties, no other parameter was found to have a significant influence on flutter problems.

An object of the invention is to provide a vertical axis wind turbine having energy exchange means between the blades and rotors.

It is a further object of the invention to provide a vertical axis wind turbine in which cyclical energy production and cyclical stresses are at least partially levelled.

It is a still further object of the invention to provide a vertical axis wind turbine having reduced strength requirements in the attachment of the blades to the rotor than is usual in such turbines in which the blades are attached rigidly to the rotor.

It is a still further object of this invention to provide a vertical axis wind turbine in which the problem of flutter affecting the blades is mitigated.

Thus, according to the invention is provided a vertical axis wind turbine having a number of blades, each blade having at least one root mounted on a rotor, energy exchange means being provided between a blade root and the rotor, the energy exchange means comprising means to provide lead/lag motion of the blade with respect to the rotor.

Also according to the invention is a vertical axis wind turbine having a number of blades, each having two ends and a body, the ends being mounted in upper and lower positions on a vertical axis rotor and the body extending outwards from the axis, the ratio of the height between the blade ends to the maximum diameter of the path described by their rotation being usually greater than 0.5, and preferably between 1 and 4, energy exchange means being provided at each upper and lower position between the rotor and the respective blade.

Embodiments of the invention will now be described by way of example with reference to the accompanying drawing in which:

FIGS. 5, 6 and 7 are schematic representations of details of alternative embodiments; and FIGS. 8, 9, 10 and 11 are diagrams showing the operation of the embodiment illustrated in FIGS. 2-5.

Figure 1:
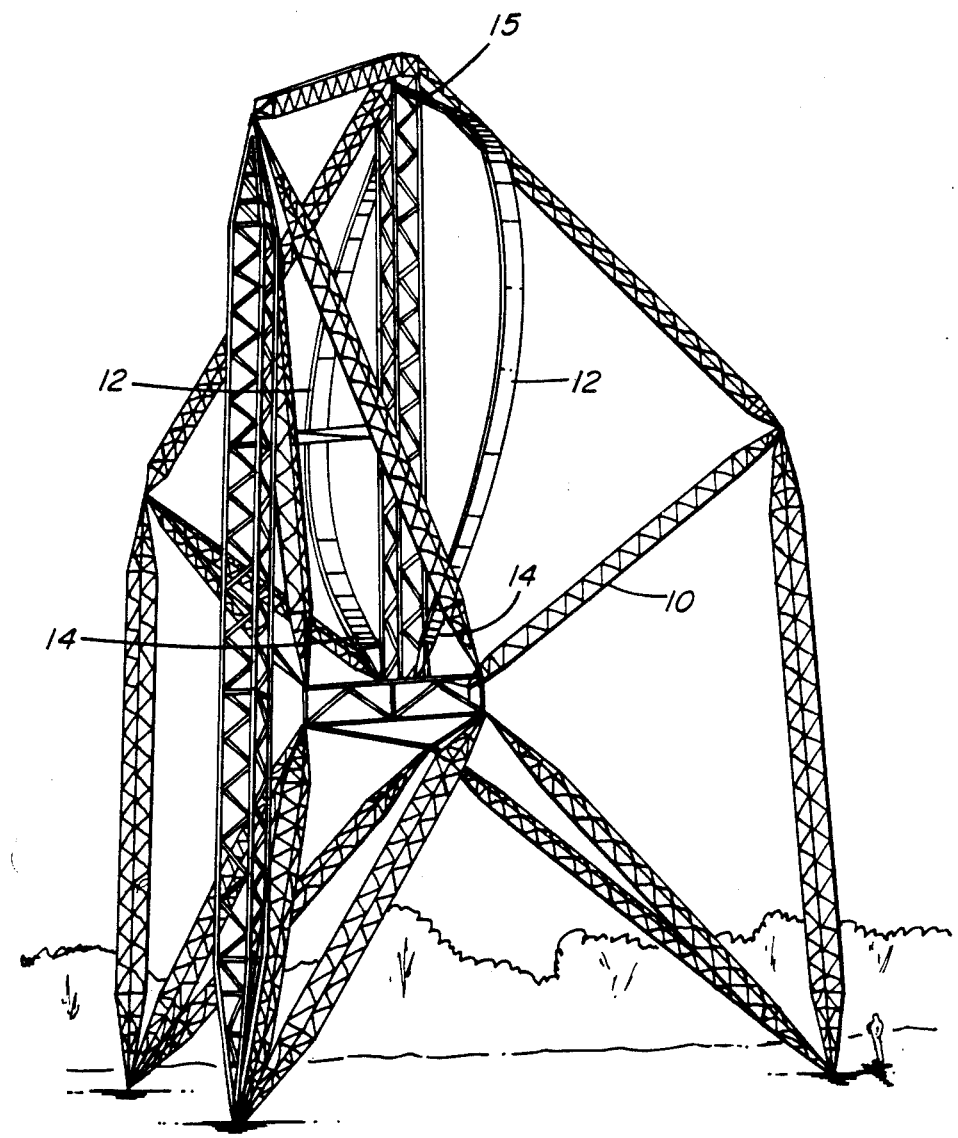
FIG. 1 is a perspective view of one wind turbine embodying the the invention.
Figure 2:
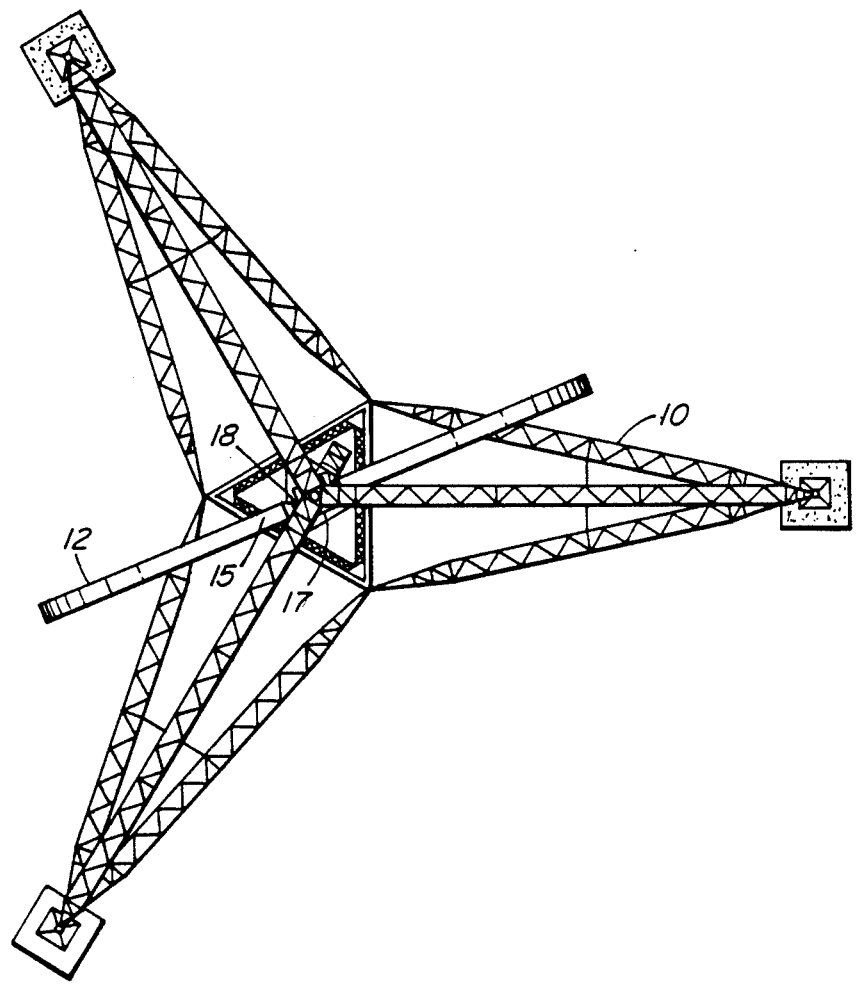
FIG. 2 is a view of the wind turbine of FIG. 1 from above.
Figure 3:
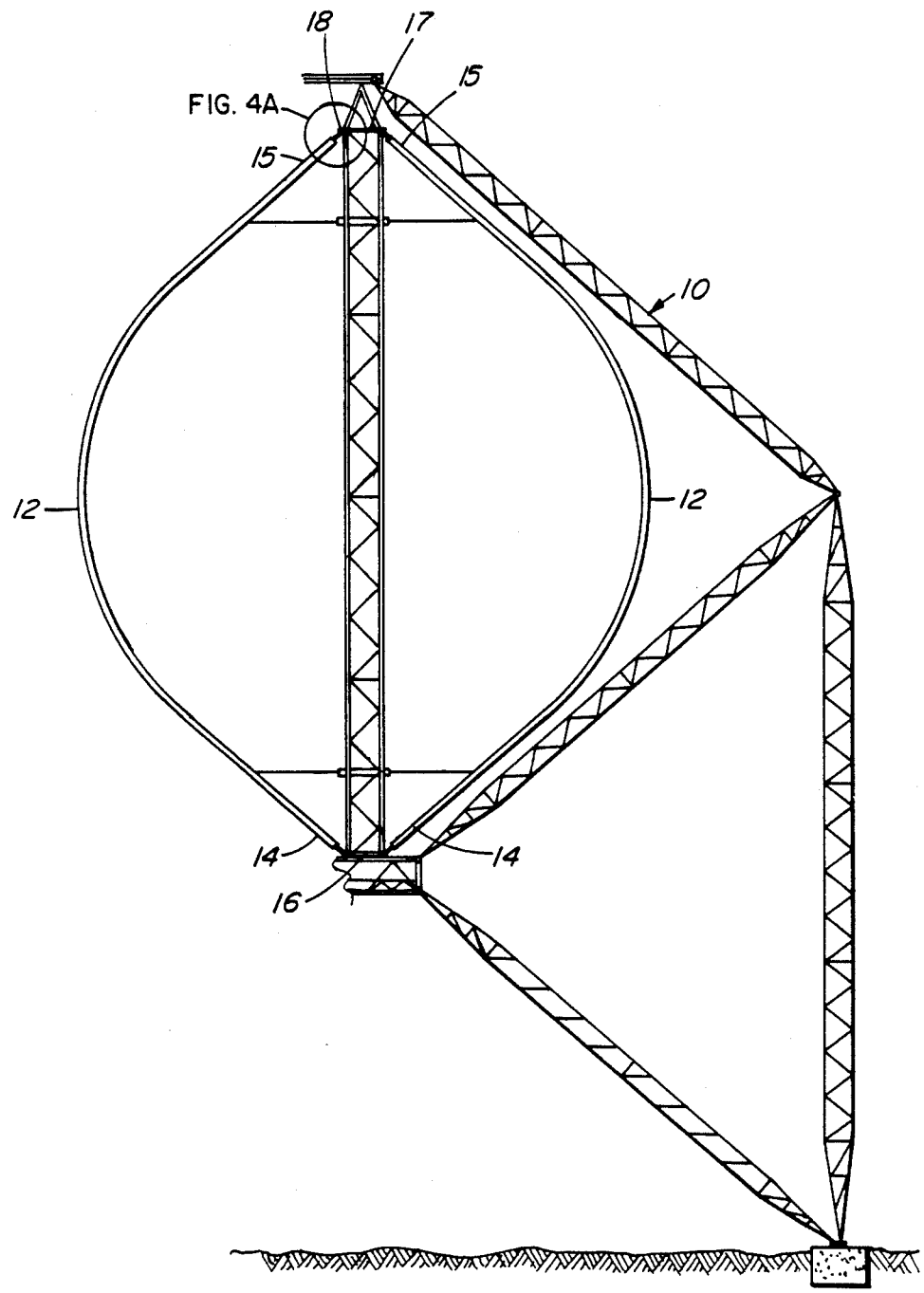
FIG. 3 is a diagrammatic vertical section through a detail of the wind turbine of FIGS. 2 and 3.
Figure 3A:
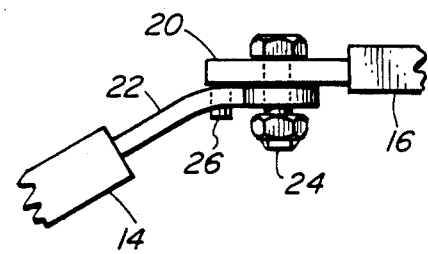
FIG. 3A is a detail on an enlarged scale of a blade hinge.

FIGS. 1-4 of the drawings show one embodiment of a wind turbine according to the invention. The turbine may be carried on a frame 10 which may have any convenient configuration. The turbine comprises a number of blades 12 connected to a rotor 16 arranged to rotate around a vertical axis to drive a power generator in any convenient manner. In the embodiment illustrated, two blades 12 are shown but it is to be understood that any suitable number may be used.

Each blade 12 is connected, at its lower root 14 and its upper root 15, to a rotor 16 through means to exchange energy between each blade 12 and the rotor 16.

The energy exchange means in this embodiment comprises a hinge between each blade root and its associated rotor arranged to permit lead/lag motion between the blades and the rotors.

One suitable form of hinge comprises a vertical hinge pin 24 located in a hole or socket of a tab 20 of rotor 16 and retained in its location by nut 28. Struts 22 extend from each end 14, 15 of blade 12, the struts converging towards each other and to hinge pin 24. As shown, the struts 22 are integral with one another in the region of the hinge pin 24 which passes through the, then, integral strut. However, the structure of struts 22 is not of importance and it is quite possible to envisage a mechanism where the struts are omitted and the blade root 14 or 15 is hinged directly to the rotor. Furthermore, as illustrated, the struts 22 are shown attached to pin 24 which rotates in tab 20 of rotor 16. Again it is not of significance whether hinge pin 24 is freely rotatable with the respect to one or either of the tab 20 or struts 22. It is only of significance that the rotor 16 and blade 12 are rotatable with respect to each other through the agency of the illustrated hinge or its equivalent.

As illustrated each blade 12 is curved in a vertical plane to enable both ends 14, 15 to be hinged to rotors 16. The blade 12 may generally be of aerofoil section and its actual dimensions and geometry are in accordance with conventional calculation for the expected winds and desired power development. Conveniently, two vertically spaced apart rotors 16 are provided, one for the ends 14, and one for the ends 15 of blades 12.

The amount of motion desirable between each blade 12 and the rotor is dependent on the geometry of the turbine but, as a practical example, it has been found that a total hinging angle for the blade 12 around the hinge pin 24 of 30 may be suitable. The hinged travel of the blade in the central portion of the hinging angle should preferably be undamped and as free as practicably possible. The end portions of the travel should preferably be damped to avoid jolting, banging and resultant stresses when the blade 12 reaches its limit of travel.

A stop or stops to define the hingeing angle may be provided in any convenient mechanical manner, for example the simple stop 26 illustrated between the struts 22. In this case the angle between the struts and the position of stop 26 defines the total hinged trave of the blade 12 since travel in either direction is stopped when the respective strut 22 abuts stop 26. Alternatively stops can be provided outside struts 22 or other suitable stop means can be provided. Shock absorbtion can be provided adjacent the stops by means of elastomeric material on or near the stop, on or near the blade, or the blade itself may be formed wholly or partially from elastomeric material.

Figure 4:
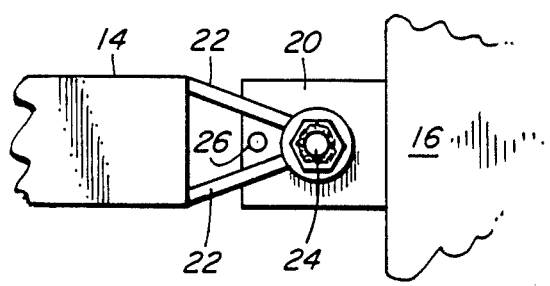
FIG. 4 is view from below of the detail of FIG. 3A.
Figure 7:
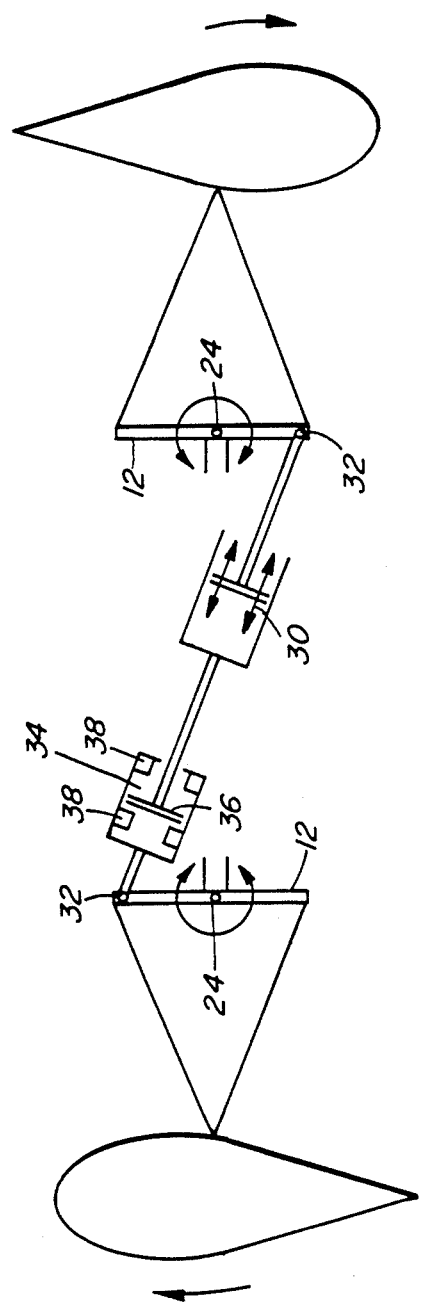

Very suitable means of defining the hingeing angle are shown diagrammatically in FIGS. 4, 5 and 6.

FIG. 4 shows the case where blades 12 hingeing about pins 24 are connected one to the other through a hydraulic damping device 30 by way of linkages 32 at their leading edges. Hydraulic piston and cylinder device 30 provides shock absorbtion in the end porion of hinged travel and any free travel may be provided in the linkage 32.

FIG. 5 shows a somewhat similar arrangement to that of FIG. 5 with the difference that two independent hydraulic devices 30 are provided for independent motion control of the blades.

FIG. 6 shows another somewhat similar arrangement but, rather than rely on the adjustment of linkages 32 for provision of free hinged travel, a free motion device 34 is present. Device 34 comprises plate 36 travelling between stops 38 in the connection between the leading edges of blades 12. This arrangement provides for accurate choice of the distance of hinged travel.

Figure 8:
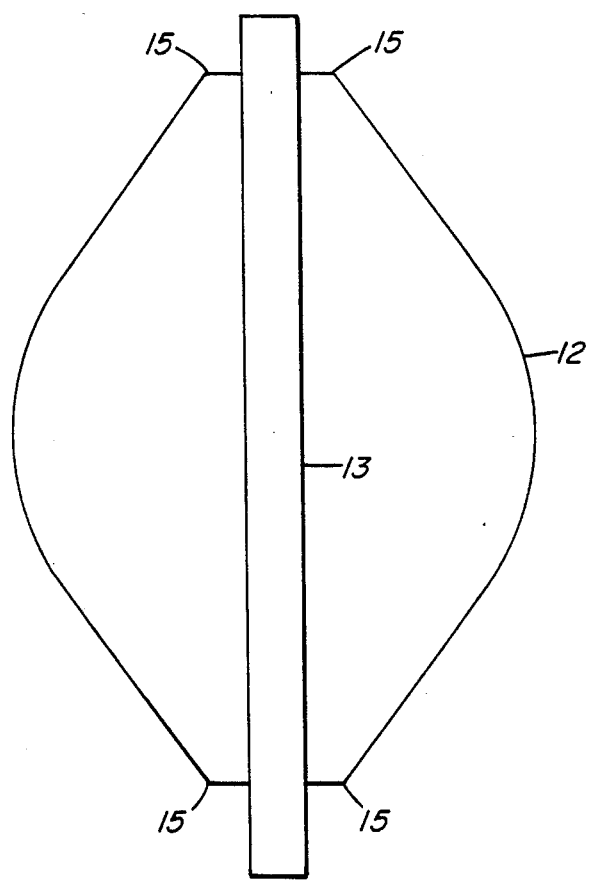
Figure 9:
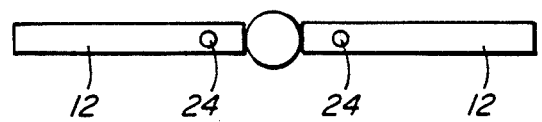

The operation of a wind turbine according to the invention is simply explained with respect to FIGS. 7, 8, 9 and 10. The turbine is diagrammatically shown in FIG. 7 having blades 12 arranged about axis of rotation 13 having energy exchange means 15 provided between blades and rotor. If the energy exchange means is a hinge about hinge pin 24, the at rest position is as shown in FIG. 8. Under wind acting to turn the rotor in the direction of the rotational arrow in FIG. 9 (for simplicity only one blade is shown), as blade 12 passes through the point shown, the provision of controlled hinged motion of the blade or flexibility of the blade root permits the blade to lead the rotor by the angle. This position also occurs under braking. The varying leading and lagging positions of the blade at any time are effective to smooth or level the cyclic variation in torque that is normal in a rigid blade turbine.

The embodiments of the invention in which an exclusive property or privelege is claimed are defined as follows:

1. A vertical axis cross-wind turbine having a number of blades, each blade being attached at its top and bottom end roots to a rotor and having energy exchange means provided between said blade roots and said rotor comprising means to provide lead/lag motion of said blade with respect to said rotor.

2. The vertical cross-wind turbine according to claim 1 wherein said energy exchange means comprises a hinge which permits lead/lag motion of the blade with respect to the rotor.

3. The vertical axis wind turbine according to claim 2 in which each hinge comprises an essentially vertical hinge pin located on the rotor about which pin the blade root end is rotatable.

4. The vertical axis turbine according to claim 3 in which stop means are provided to limit rotation of the blade about the hinge pin.

5. The vertical axis turbine according to claim 4 in which shock absorbing means are provided for travel of the blade approaching the stop means.

6. A vertical axis cross-wind turbine according to claim 1, wherein the roots of each blade are mounted respectively in upper and lower positions on a vertical axis rotor to extend outwards from the axis, the ratio of the height between the blade ends to the maximum diameter of the path described by their rotation being from 0.5 to 4.

7. A vertical axis wind turbine having a number of blades, each having two ends and a body, the ends being mounted in upper and lower positions on a vertical axis rotor and the body extending outwards from the axis, the ratio of the height between the blade ends to the maximum diameter of the path described by their rotation being from 1 to 2, energy exchange means being provided between each blade and the rotor at said upper and lower positions, each energy exchange means comprising a hinge between the rotor and the respective blade, which hinge which permits lead/lag motion of the blade with respect to the rotor.

8. A vertical axis wind turbine as claimed in claim 7 in which each hinge comprises an essentially vertical hinge pin located on the rotor about which pin the blade end is rotatable.

9. A vertical axis turbine as claimed in claim 8 in which stop means are provided to limit rotation of the blade about the hinge pin.

10. A vertical axis turbine as claimed in claim 9 in which shock absorbing means are provided for travel of the blade approaching the stop means.

* * * * *